US008705850B2

(12) United States Patent
Naito et al.

(10) Patent No.: US 8,705,850 B2
(45) Date of Patent: Apr. 22, 2014

(54) OBJECT DETERMINING DEVICE AND PROGRAM THEREOF

(75) Inventors: Takashi Naito, Tajimi (JP); Shinichi Kojima, Nisshin (JP); Satoru Nakanishi, Aichi-gun (JP); Isahiko Tanaka, Susono (JP); Junya Kasugai, Kariya (JP); Takuhiro Omi, Anjo (JP); Hiroyuki Ishizaka, Hino (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 1342 days.

(21) Appl. No.: 12/487,958

(22) Filed: Jun. 19, 2009

(65) Prior Publication Data

US 2010/0183218 A1 Jul. 22, 2010

(30) Foreign Application Priority Data

Jun. 20, 2008 (JP) .................................. 2008-161356

(51) Int. Cl.
*G06K 9/62* (2006.01)
*G06K 9/72* (2006.01)

(52) U.S. Cl.
USPC ........... 382/159; 382/115; 382/118; 382/209; 382/212; 382/213; 382/224

(58) Field of Classification Search
USPC .......... 382/115, 118, 159, 209, 212, 213, 224
See application file for complete search history.

(56) References Cited

U.S. PATENT DOCUMENTS

| 7,321,670 | B2 * | 1/2008 | Yoon et al. | 382/118 |
| 7,430,314 | B2 * | 9/2008 | Porter et al. | 382/159 |
| 2002/0150291 | A1 | 10/2002 | Naf et al. | |
| 2004/0013304 | A1 * | 1/2004 | Viola et al. | 382/224 |
| 2004/0091137 | A1 | 5/2004 | Yoon et al. | |
| 2005/0105780 | A1 * | 5/2005 | Ioffe | 382/118 |
| 2006/0072811 | A1 | 4/2006 | Porter et al. | |
| 2006/0088207 | A1 * | 4/2006 | Schneiderman | 382/159 |
| 2007/0177794 | A1 * | 8/2007 | Gu | 382/160 |
| 2009/0041310 | A1 * | 2/2009 | Yang et al. | 382/118 |

FOREIGN PATENT DOCUMENTS

| JP | 2002-279416 A | 9/2002 |
| JP | 2003-296712 A | 10/2003 |
| JP | 2004-158013 A | 6/2004 |
| JP | 2006-508463 A | 3/2006 |
| JP | 2007-111992 A | 5/2007 |

OTHER PUBLICATIONS

Japanese Office Action dated May 22, 2012, issued in Japanese Patent Application No. 2008-161356.

* cited by examiner

*Primary Examiner* — Matthew Bella
*Assistant Examiner* — Julian Brooks
(74) *Attorney, Agent, or Firm* — Sughrue Mion, PLLC

(57) ABSTRACT

An object determining device includes imaging means for obtaining an image of the object, likelihood value calculating means for calculating a first likelihood value for the object shown in the image by use of the image obtained by the imaging means and a machine learning system and for calculating a second likelihood value for the object shown in the image by use of the image obtained by the imaging means and another machine learning system, the first likelihood value indicating a level of likelihood that the object is wearing the covering and the second likelihood value indicating a level of likelihood that the object is not wearing the covering, and determining means for determining whether or not the object, shown in the image obtained by the imaging means, is wearing a covering, on the basis of a ratio between the first likelihood value and the second likelihood value.

11 Claims, 3 Drawing Sheets

Face image without mask

Face image with mask

Face image without mask

Face image with mask

OBJECT DETERMINING DEVICE AND PROGRAM THEREOF

CROSS REFERENCE TO RELATED APPLICATIONS

This application is based on and claims priority under 35 U.S.C. §119 to Japanese Patent Application 2008-161356, filed on Jun. 20, 2008, the entire content of which is incorporated herein by reference.

FIELD OF THE INVENTION

The present invention relates to an object determining device and a program thereof for determining whether or not an object is wearing a covering.

BACKGROUND

Generally, facial state values of an object person indicating a facial direction, a state of blinking and a line of sight are estimated by use of facial feature values of a mouth, a nose and the like extracted from a face image of the object person. In a case where the object person is wearing a mask and/or sunglasses, however, those facial state values may not be accurately estimated. A patent document JP2003-296712A discloses a method for estimating a direction of a face of an object in consideration of a covering, such as a mask and/or sunglasses, attached to the face. According to the known method, an operational circuit extracts feature points of eyes, a mouth and a nose from a face image and, on the basis of the extracted feature points, the face direction is estimated. In this method, when the feature points indicating eyes are not extracted for a repetitive number of times, the operational circuit determines that the object is wearing sunglasses, and the face direction of the object is estimated by use of image features on the sunglasses. Further, when the feature points indicating that the nose and the mouth are not extracted for a repetitive number of times, the operational circuit determines that the object is wearing a mask, and the face direction of the object is estimated by use of image features on the mask.

According to the known method, the operational circuit determines that the object is wearing the mask and/or the sunglasses when the feature values corresponding to the eyes, the nose and the mouth are not extracted, however, in a case where a face direction of a driver driving a vehicle is estimated, feature points of the eyes, nose and mouth may not be detected frequently, even when the driver is not wearing a mask and/or sunglasses. Specifically, such misdetection may occur due to a change of a local brightness in the face image caused by variations of luminosity in an actual driving environment, a posture of the driver's face and the like. Accordingly, even when the driver is not wearing the sunglasses and/or the mask, because the operational circuit may determine that the driver is wearing the sunglasses and/or the mask due to the misdetection described above, a facial state value indicating the direction of the driver's face may be estimated on the basis of the feature point on the sunglasses and/or mask that do not actually exist. As a result, an accurate facial state value is not obtained, and further a facial state value having a large error may be calculated.

A need thus exists for an object determining device and a program thereof which are not susceptible to the drawback mentioned above.

SUMMARY OF THE INVENTION

According to an aspect of the present invention, an object determining device includes imaging means for obtaining an image of the object, likelihood value calculating means for calculating a first likelihood value for the object shown in the image obtained by the imaging means by use of the image obtained by the imaging means and a machine learning system trained so as to respond to a sample image of a sample object that is wearing a covering and for calculating a second likelihood value for the object shown in the image obtained by the imaging means by use of the image obtained by the imaging means and a machine learning system trained so as to respond to a sample image of a sample object that is not wearing a covering, the first likelihood value indicating a level of likelihood that the object is wearing the covering and the second likelihood value indicating a level of likelihood that the object is not wearing the covering, and determining means for determining whether or not the object, shown in the image obtained by the imaging means, is wearing a covering, on the basis of a ratio between the first likelihood value and the second likelihood value calculated by the likelihood value calculating means.

According to another aspect of the present invention, a program stored in a computer readable medium for a computer executing steps of calculating a first likelihood value for the object shown in the image obtained by the imaging means by use of the image obtained by the imaging means and a machine learning system trained so as to respond to a sample image of a sample object that is wearing a covering, calculating a second likelihood value for the object shown in the image obtained by the imaging means by use of the image obtained by the imaging means and a machine learning system trained so as to respond to a sample image of a sample object that is not wearing a covering, the first likelihood value indicating a level of likelihood that the object is wearing the covering and the second likelihood value indicating a level of likelihood that the object is not wearing the covering and determining whether or not the object, shown in the image obtained by the imaging means, is wearing a covering, on the basis of a ratio between the first likelihood value and the second likelihood value calculated by the likelihood value calculating means.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
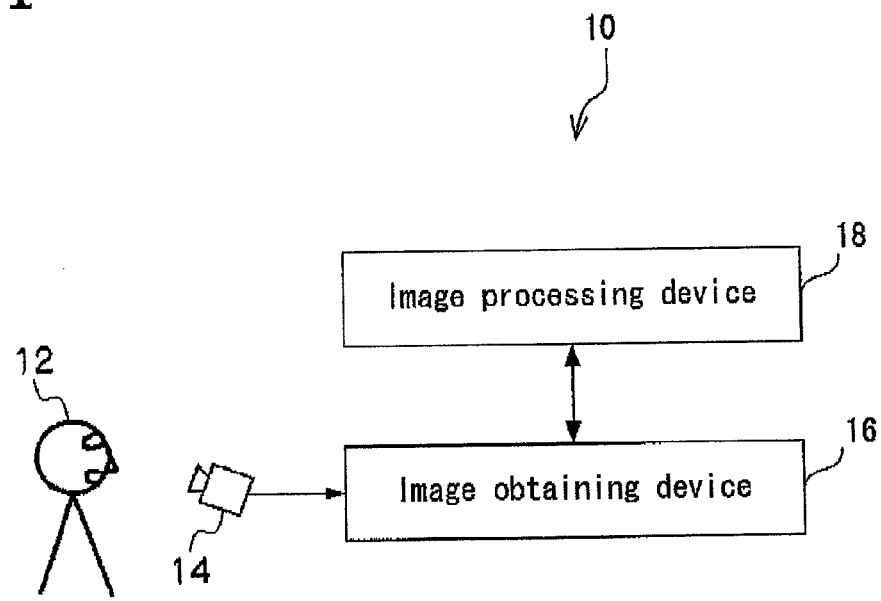
FIG. 1 illustrates a schematic configuration diagram indicating an object determining device of an embodiment related to the present invention.

FIG. 1 illustrates a configuration diagram schematically indicating an object determining device 10 of an embodiment related to the present invention. The object determining device 10 takes an image of a face of a person and determines whether or not the person is wearing a covering on the basis of the taken image (i.e., determines whether or not a covering is attached to the face of the person). In the embodiment, the covering includes a mask applied to a mouth of the person.

As indicated in the diagram of FIG. 1, the object determining device 10 includes a camera 14 for capturing an object person 12, an image obtaining device 16 and an image processing device 18.

The image obtaining device 16 is equipped with an image memory in which an image data of the object person 12 captured by the camera 14 is stored. The image obtaining device 16 reads the image data from the image memory, and the read image data is outputted to the image processing device 18.

Figure 2:
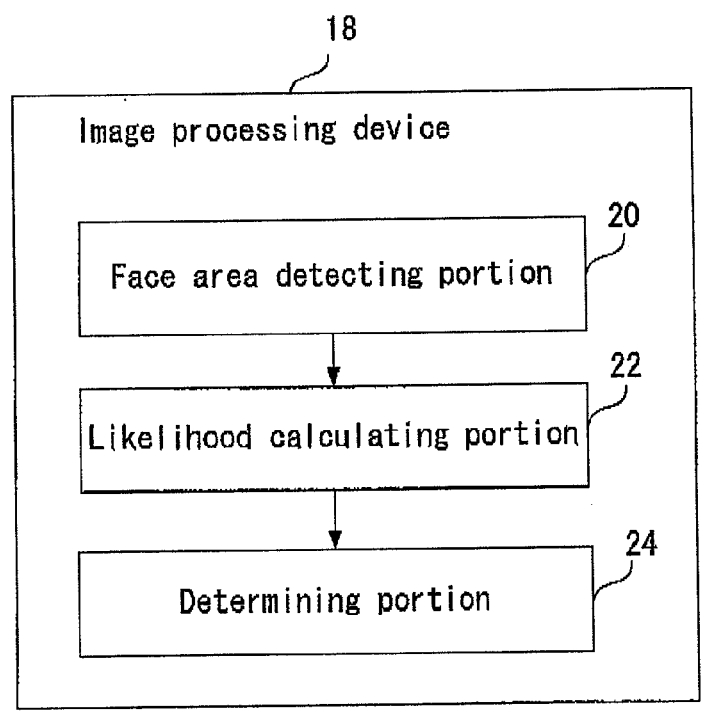
FIG. 2 illustrates a functional configuration diagram indicating an image processing device.

FIG. 2 illustrates a function-configuration diagram indicating the image processing device 18.

The image processing device 18 executes a process for determining whether or not a mask is attached to the face of the object person 12 on the basis of the image data outputted from the image obtaining device 16. The image processing device 18 includes a face area detecting portion 20, a likelihood calculating portion 22 and a determining portion 24.

The face area detecting portion 20 detects an area in which the face of the object person 12 exists in the image data outputted from the image obtaining device 16. The detected area will also be referred to as a face area. Various types of technology for detecting the face area are developed, and in the embodiment, a neural network-based face detection technology, which is one of discriminators with capability being excellent in pattern recognition, to detect the face in the input face image, proposed by H. Rowley et al., may be used. This technology is well described in "Neural Network-based Face-Detection", IEEE Transactions on Pattern Analysis and Machine Intelligence, Vol. 20, No. 1, 1998, pp. 23-38. The neural network will simply be referred to as NN. Because the face area detecting portion 20 is not for determining whether or not the object person 12 is wearing a mask, NN is trained to detect a face of the object person regardless of whether the object person 12 is wearing the mask or not.

Specifically, NN, in which an input layer, a hidden layer and an output layer are connected, learns a connection between known input data and output data. In this embodiment, NN learns the connection by use of a learning method called Backpropagation. For example, NN is trained by applying a teacher signal "1" thereto as excitatory information so as to output a signal "1" from the output layer of the NN in response to both of a large number of face images without mask, which are prepared in advance (i.e., a sample image of a sample object that is not wearing a covering), illustrated in FIG. 3A and a large number of face images with various types of masks, which are also prepared in advance (i.e., sample image of a sample object that is wearing a covering), illustrated in FIG. 3B. At the same time, the NN is also trained by applying a teacher signal "0" thereto as inhibitory information so as to output a signal "0" from the output layer of the NN in response to a large number of images that are completely different from the face, which are prepared in advance (e.g., image of surroundings), as non-face images. Such NN will be referred to as a face with/without mask response NN.

The likelihood calculating portion 22 calculates a first likelihood value v1 and a second likelihood value v2 for the face area detected by the face area detecting portion 20. Specifically, the first likelihood value v1 indicates a level of likelihood of a face with mask (i.e., likelihood that the object is wearing a covering), and the second likelihood value v2 indicates a level of likelihood of a face without mask (i.e., likelihood that the object is not wearing a covering).

Figure 3A:
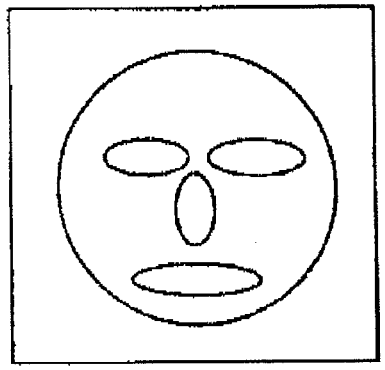
FIG. 3A illustrates a diagram indicating an example of a face image to which a mask is not attached.

Specifically, the first likelihood value v1 indicating the level of likelihood of the face with the mask is calculated in such a way that NN being trained to response to only an image of face with mask (hereinafter referred to as a face with mask response NN) is applied for the face area detected by the face area detecting portion 20. At this point, in the same manner as the face with/without mask response NN, the face with mask response NN is also trained, by means of Backpropagation, by applying a teacher signal "1" thereto as excitatory information so as to output a signal "1" from the output layer of the NN in response to a large number of face images with various types of masks as illustrated in FIG. 39, and is also trained, by means of Backpropagation, by applying a teacher signal "0" thereto as inhibitory information so as to output a signal "0" from the output layer of the NN in response to a large number of face images without mask as illustrated in FIG. 3A. By training the face with mask response NN as mentioned above, the face with mask response NN may meet expectations that the output layer thereof outputs a relatively high output value for the face image with the mask and outputs a relatively low output value for the face image without the mask. The face with mask response NN is trained so as to output the value between 0 and 1 from the output layer. In this embodiment, the output value as-is from the face with mask response NN applied to the face area detected by the face area detecting portion 20 is used as the first likelihood value v1. Therefore, the first likelihood value v1 is set to be between 0 and 1.

Figure 3B:
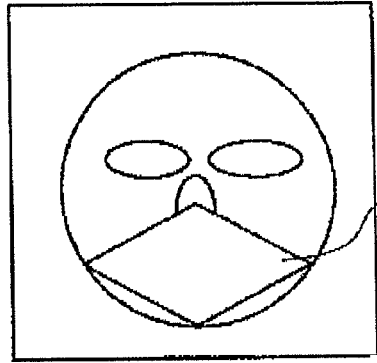
FIG. 3B illustrates a diagram indicating an example of a face image to which a mask is attached.

Specifically, the second likelihood value v2 indicating the level of likelihood of the face without the mask is calculated in such a way that NN being trained to response to only an image of face without mask (hereinafter referred to as a face without mask response NN) is applied for the face area detected by the face area detecting portion 20. At this point, in the same manner as the face with/without mask response NN, the face without mask response NN is also trained, by means of Backpropagation, by applying a teacher signal "1" thereto as excitatory information so as to output a signal "1" from the output layer of the NN in response to a large number of face images without mask as illustrated in FIG. 3A, and is also trained, by means of Backpropagation, by applying a teacher signal "0" thereto as inhibitory information so as to output a signal "0" from the output layer of the NN in response to a large number of face images with various types of masks as illustrated in FIG. 3B. By training the face without mask response NN as mentioned above, the face without mask response NN may meet expectations that the output layer thereof outputs a relatively high output value for the face image without the mask and outputs a relatively low output value for the face image with the mask. The face without mask response NN is trained so as to output the value between 0 and 1 from the output layer. In this embodiment, the output value as-is from the face without mask response NN applied to the face area detected by the face area detecting portion 20 is used as the second likelihood value v2. Therefore, the second likelihood value v2 is set to be between 0 and 1.

The determining portion 24 determines whether or not a mask is attached to the face of the object person 12 in the image captured by the camera 14, by use of the first likelihood value v1 and the second likelihood value v2 calculated by the likelihood calculating portion 22.

Constitutive elements of each of the image obtaining device 16 and the image processing device 18 include a computer comprised of CPU, RAM, ROM and the like (e.g., computer readable medium). Specifically, the image obtaining device 16 and the image processing device 18 function in such a way that processes, which will be described in detail below, are executed by executing programs stored in the ROM and a predetermined memory. The image obtaining device 16 and the image processing device 18 may respectively use a specialized computer or may share a single computer.

A detailed description of a mask wearing determination process (e.g., program) according to the embodiment will be provided hereinafter.

Figure 4:
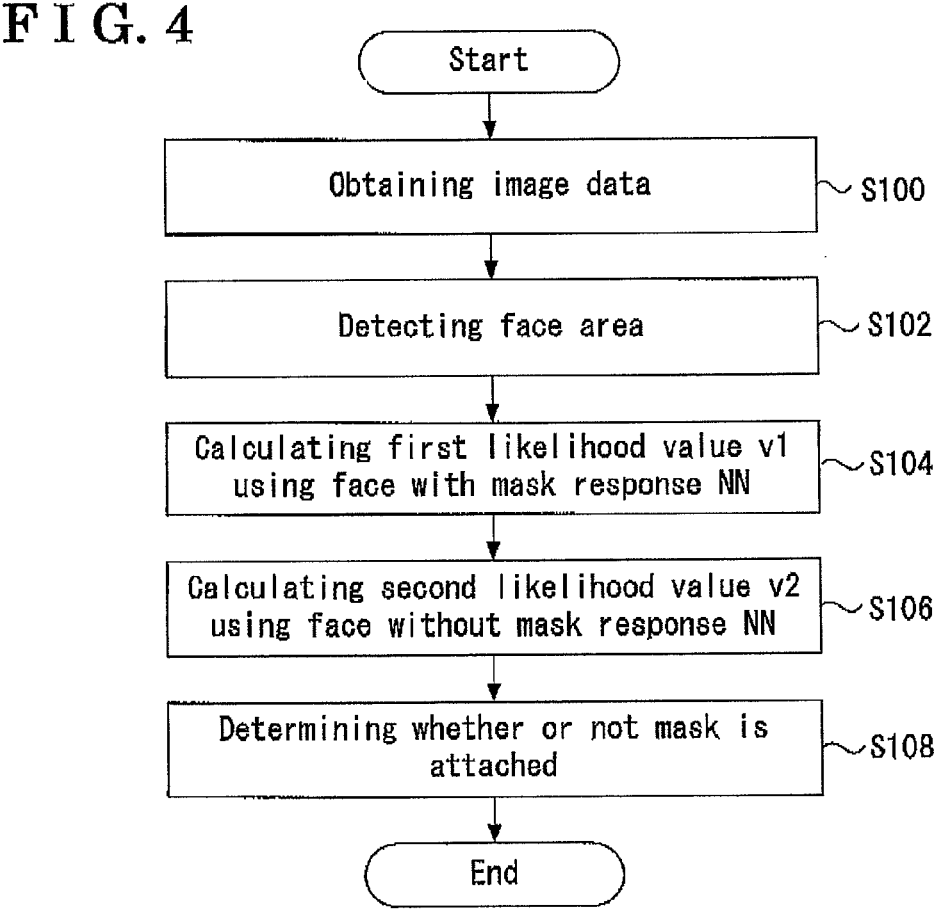
FIG. 4 illustrates a flowchart indicating a mask wearing determination process executed by an image obtaining device and an image processing device of the object determining device.

Illustrated in FIG. 4 is a flowchart showing a mask wearing determining process, which is executed by the image obtaining device 18 and the image processing device 18 of the object determining device 10.

In Step S100, the image obtaining device 16 obtains the image data captured by the camera 14 and temporarily memorizes the obtained image data into the image memory. The image obtaining device 16 then reads the image data from the image memory and inputs the read image data into the face area detecting portion 20 of the image processing device 18. In Step S102, the face area detecting portion 20 detects a face area from an image, which is shown in the image data inputted by the image obtaining device 16, by means of the face with/without mask response NN, regardless of whether the mask is attached or not.

In Step S104, the likelihood calculating portion 22 applies the face with mask response NN to the face area detected by the face area detecting portion 20 in order to calculate the first likelihood value v1. As described above, the face with mask response NN has been trained so as to output "1" for to a face image wearing the mask, and to output "0" for the face image not wearing the mask. Therefore, the first likelihood value v1 is calculated to be within a range from 0 to 1. Accordingly, it is expected that the first likelihood value v1 calculated by applying the face with mask response NN to the face image wearing the mask is larger than the first likelihood value v1 calculated by applying the face with mask response NN to the face image not wearing the mask.

In Step S106, the likelihood calculating portion 22 applies the face without mask response NN to the face area detected by the face area detecting portion 20 in order to calculate the second likelihood value v2. As described above, the face without mask response NN has been trained so as to output "1" relative to a face image not wearing the mask, and to output "0" for the face image wearing the mask. Therefore, the second likelihood value v2 is also calculated to be within a range from 0 to 1. Accordingly, it is expected that the second likelihood value v2 calculated by applying the face without mask response NN to the face image not wearing the mask is larger than the second likelihood value v2 calculated by applying the face without mask response NN to the face image wearing a mask.

In step S108, the determining portion 24 determines whether or not the object person 12 is wearing the mask (i.e. whether or not the mask is attached to the object person 12) by using a ratio between the first likelihood value v1 and the second likelihood value v2. A ratio between the first likelihood value v1 and the second likelihood value v2 is calculated by a formula 1.

$$r = \text{first likelihood value } v1/\text{second likelihood value } v2 \quad \text{(formula 1)}$$

When the face image of the object person 12 captured by the camera 14 is wearing the mask (i.e. when the mask is attached to the object person 12 in the face image captured by the camera 14), it is expected that the first likelihood value v1 is approximated to 1, and the second likelihood value v2 is approximated to 0. Therefore, the ratio r of the first likelihood value v1 relative to the second likelihood value v2 is sufficiently larger than 1. On the other hand, when the face image of the object person 12 captured by the camera 14 is not wearing the mask (i.e. when the mask is not attached to the object person 12 in the face image captured by the camera 14), it is expected that the first likelihood value v1 is approximated to 0, and the second likelihood value v2 is approximated to 1. Therefore, the ratio r of the first likelihood value v1 relative to the second likelihood value v2 is sufficiently smaller than 1.

When the ratio r of the first likelihood value v1 relative to the second likelihood value v2 is sufficiently large, the determining portion 24 determines that the mask is attached to the face image, and when the ratio r of the first likelihood value v1 relative to the second likelihood value v2 is sufficiently small, the determining portion 24 determines that the mask is not attached to the face image. The determinations are executed by using the following comparison expressions 2 and 3.

$$r > th1: \text{the mask is attached to the face image} \quad \text{(comparison expression 2)}$$

$$r < th2: \text{the mask is not attached to the face image} \quad \text{(comparison expression 3)}$$

The th1 and th2 represent threshold values for the determination, and the following relational expression is established therebetween.

$$0 < th2 < th1$$

For example, 50 may be set to th1, 0.01 may be set to th2. Further, when neither the comparison expression 2 nor the comparison expression 3 is established, the determining portion 24 may determine that the determination is not executed with sufficient accuracy, and such determination may be suspended.

Thus, the two NNs (the face with mask response NN that only responds to the face image with the mask, and the face without mask response NN that only responds to the face image without the mask), are respectively applied in order to calculate the first likelihood value v1 and the second likelihood value v2, and by using the ratio r between the first likelihood value v1 and the second likelihood value v2, the determination may be executed with more accuracy, and frequency of a false detection may be reduced.

A result of the mask wearing determination process may be used for executing an estimation process of a state of the face. For example, when the covering of the mask is determined, because the mouth and the nose are considered to be covered by the mask, feature amounts of the mouth and the nose are not easy to be detected in the face image. In this situation, the estimation process of the state of the face may be executed by using the feature amount of other features of the face. Consequently, a state of the face may be stably estimated by efficiently switching steps between the case where the mask is attached and the case where the mask is not attached.

Further, according to the embodiment, an example for determining whether or not the mask is attached to the face in the image is described. However, the similar process to the above-described embodiment may be applied for determining whether or not sunglasses are attached to the face in the image. In other words, a first NN, which responds only to a face image with the sunglasses, and a second NN, which responds only to a face image without the sunglasses, are prepared in order to calculate two likelihood values by using the first and second NNs. Then, a ratio between the two likelihood values are calculated, and the calculated likelihood values are respectively compared to threshold values. Consequently, the similar effects to the embodiment may be obtained.

Further, a configuration may be modified in such a way that existences of both of the mask and the sunglasses are determined in the face image. In other words, a first NN, which responds only to a face image with both of the mask and the sunglasses, and a second NN, which responds only to a face image without both of the mask and the sunglasses, are prepared in order to calculate two likelihood values by using the first and second NNs. Then, a ratio between the two likelihood values are calculated, and the calculated likelihood values are respectively compared to threshold values. Consequently, the similar effects to the embodiment may be obtained.

According to the above-described embodiment, the two different NNs are used in order to determine the attachment/nonattachment of the mask. However, not limited to the above-described embodiment, a machine-learning system being different from the NN, such as a support vector machine, may be alternatively used.

Further, according to the embodiment, the NNs are applied to the entire face image in order to determine the attachment/nonattachment of the mask, as an example. However, the attachment/nonattachment of the mask may be determined on the basis of only a lower half of the face image. A modified embodiment, in which the lower half of the face image is used to determine the attachment/nonattachment of the mask, will be described below.

An object determining device according to the modified embodiment is similar to the object determining device 10 according to the above-described embodiment. However, configurations described hereinafter function as follows.

Similar to the above-described embodiment, the face area detecting portion 20 of the image processing device 18 detects a face area of the object person 12 from the image shown in the image data captured by the camera 14. Further, the face area detecting portion 20 extracts the image data of the lower half area of the image (the detected face area is cut in upper and lower half) and outputs the extracted image data to the likelihood calculating portion 22. The lower half area is an area in which, under a hypothesis where the mask 12 is attached to the object person 12, the mask is estimated to exist.

The likelihood calculating portion 22 calculates the first likelihood value v1, which shows a level of likelihood of the face with the mask, and the second likelihood value v2, which shows a level of likelihood of the face without the mask, relative to the image shown in the image data detected and extracted by the face area detecting portion 20.

The face with mask response NN and the face without mask response NN used for calculating the first likelihood value v1 and the second likelihood value v2, respectively, are trained by using a lower half of the image with the mask and a lower half of the image without the mask.

Figure 5A:
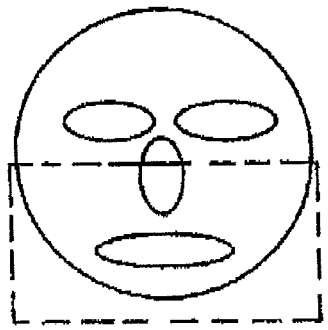
FIG. 5A illustrates a diagram indicating an example of a extracted face image within a lower half area in an image of an object to which a mask is not attached.
Figure 5B:
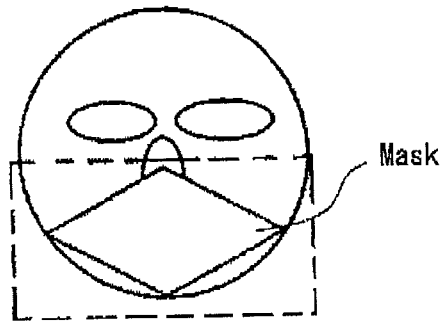
FIG. 5B illustrates a diagram indicating an example of an extracted face image within a lower half area in an image of an object to which a mask is attached.

In other words, by using a method of Backpropagation, the face with mask response NN is trained by applying a teacher signal 1 thereto as excitatory information so as to output a signal "1" from the output layer of the NN in response to a prepared large number of lower half face images with mask (i.e., a lower half of a sample image of a sample object that is wearing a covering) as is enclosed by a dashed-line in FIG. 5B. At the same time, the face with mask response NN is also trained by applying a teacher signal 0 thereto as inhibitory information so as to output a signal "0" from the output layer of the NN in response to a prepared large number of lower half face images without mask (i.e., a lower half of a sample image of a sample object that is not wearing a covering) as is enclosed by a dashed-line in FIG. 5A and a prepared large number of non-face images that are completely different from the face image.

In the same way as the face with mask response NN, by using a method of Backpropagation, the face without mask response NN is trained by applying a teacher signal 1 thereto as excitatory information so as to output a signal "1" from the output layer of the NN in response to a prepared large number of lower half face images without mask as is enclosed by a dashed-line in FIG. 5A. At the same time, the face without mask response NN is also trained by applying a teacher signal 0 thereto as inhibitory information so as to output a signal "0" from the output layer of the NN in response to a prepared large number of lower half face images with mask as is enclosed by a dashed-line in FIG. 5B and a prepared large number of non-face images that are completely different from the face image.

Figure 6A:
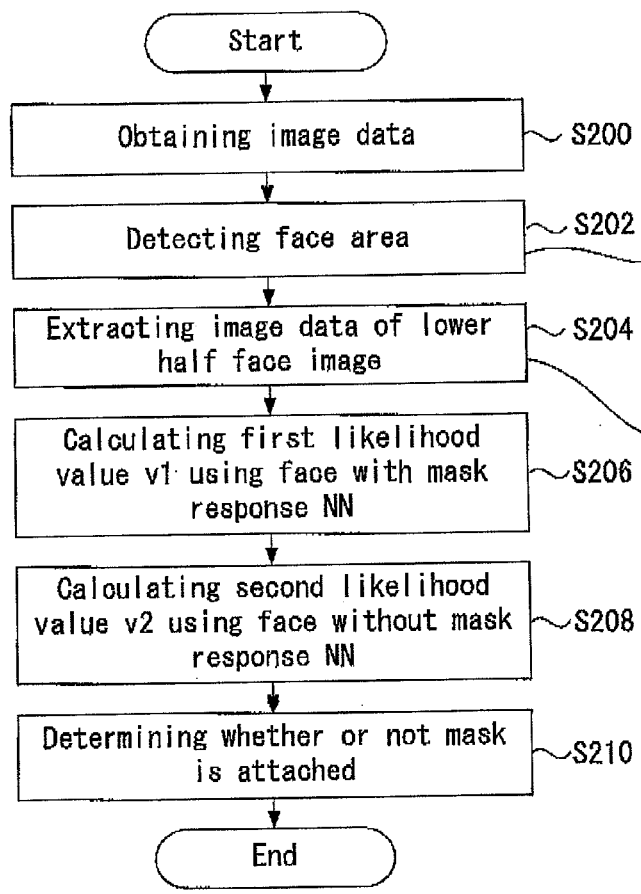
FIG. 6A illustrates a flowchart indicating a modified example of the mask wearing determination process executed by the image obtaining device and the image processing device of the object determining device

Illustrated in FIG. 6A is a flow chart showing the mask wearing determining process executed by the image obtaining device 16 and the image processing device 18 of the object determining device 10 according to the modified example.

Figure 6B:
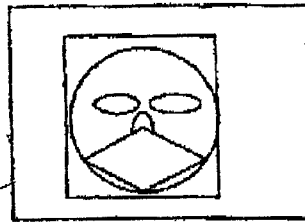
FIG. 6B illustrates a diagram indicating an example of an image of a detected face area.

Steps S200 to S202 are processes for loading the image data obtained by the camera 14 in order to detect the face area (see FIG. 6B). Steps S200 to S202 are similar to steps S100 to S102, therefore description thereof will be omitted.

Figure 6C:
FIG. 6C illustrates a diagram indicating an extracted face image within a lower half area in the image in the detected face area.

In Step S204, the face area detecting portion 20 extracts the image data of the lower half face image (the face area is out in upper and lower half) of the detected face area of the object person 12 from the image data captured by the image obtaining device 16 and outputs the extracted lower half face image of the face area in the likelihood calculating portion 22 (see FIG. 6C).

In step S206, the likelihood calculating portion 22 applies the face with mask response NN to the image data of the lower half face area extracted by the face area detecting portion 20 in order to calculate the first likelihood value v1.

In step S206, the likelihood calculating portion 22 applies the face without mask response NN to the image data of the lower half face area extracted by the face area detecting portion 20 in order to calculate the second likelihood value v2.

In step 210, the determining portion 24 determines whether or not the object person 12 is wearing the mask (i.e. whether or not the mask is attached to the object person 12) on the basis of the ratio between the first likelihood value v1 and the second likelihood value v2. A method for the determination is similar to step S108, therefore a description will be omitted.

Thus, the determination of attachment/nonattachment of the mask is executed only for the lower half of the face area, and consequently, time required for processing may be reduced.

According to the modified example, the attachment/nonattachment of the mask is determined. However, the attachment/nonattachment of the sunglasses may also be determined. In such a case, an upper half face image of the face area is extracted in the steps similar to the above-described steps, and a face with sunglasses response NN and a face without sunglasses response NN, which have been trained on the basis of the upper half areas of the face images, are applied in order to execute a determination of attachment/nonattachment of the sunglasses.

According to the above-described embodiment and the modified embodiment, the first likelihood value v1 is calculated before the second likelihood value v2 is calculated. However, the first likelihood value v1 may be calculated after the second likelihood value v2 is calculated.

According to the above-described embodiment and the modified embodiment, whether or not the mask and the like is attached/not attached to a face of a person is determined. However, not limited to the above-described embodiment and modified embodiment, the determination is applied to various types of objects.

The object determining device includes imaging means for obtaining an image of the object, likelihood value calculating means for calculating a first likelihood value for the object shown in the image obtained by the imaging means by use of the image obtained by the imaging means and a machine learning system trained so as to respond to a sample image of a sample object that is wearing a covering and for calculating a second likelihood value for the object shown in the image obtained by the imaging means by use of the image obtained by the imaging means and a machine learning system trained so as to respond to a sample image of a sample object that is not wearing a covering, the first likelihood value indicating a level of likelihood that the object is wearing the covering and the second likelihood value indicating a level of likelihood that the object is not wearing the covering and determining means for determining whether or not the object, shown in the image obtained by the imaging means, is wearing a covering, on the basis of a ratio between the first likelihood value and the second likelihood value calculated by the likelihood value calculating means.

By use of the machine learning system trained so as to respond to the sample image in which the covering is attached to the sample object (i.e., the sample object is wearing the covering) and the machine learning system trained so as to respond to the sample image in which the covering is not attached to the sample object (i.e., the sample object is not wearing the covering), the two likelihood values are calculated, and on the basis of the ratio between the two likelihood values, the determining means determines whether or not the object is wearing the covering. Accordingly, the covering to the object may be determined with high reliability. By use of a ratio between two different likelihood values calculated on the basis of two different machine learning systems as a reference for the estimation, comparing to a case where a single type of a machine learning system is used, a misdetection may occur less frequently. Further, even when the difference between absolute values of the likelihood values calculated on the basis of the two different types of the machine learning systems, because the ratio between the two different likelihood values are used for the determination, a comparison between the level of the likelihood that the object is not wearing the covering and the level of the likelihood that the object is wearing the covering may become clearer. As a result, a level of the accuracy of the detection may be increased.

The object determining device further including extracting means for extracting, when assuming that the object is wearing the covering, an image within a predetermined area where a covering is estimated to exist, from the image obtained by the imaging means, and wherein the likelihood value calculating means calculates a first likelihood value for the object shown in the image obtained by the imaging means by use of the image within the predetermined area extracted by the extracting means and a machine learning system trained so as to respond to an image within a predetermined area in a sample image of a sample object that is wearing a covering and calculates a second likelihood value for the object shown in the image obtained by the imaging means by use of the image within the predetermined area extracted by the extracting means and a machine learning system trained so as to respond to an image within a predetermined area in a sample image of a sample object that is not wearing a covering, and the first likelihood value indicates the level of likelihood that the object is wearing the covering and the second likelihood value indicates the level of likelihood that the object is not wearing the covering.

When assuming that the object is wearing the covering, the image within the predetermined area where the covering is estimated to exist is extracted from the image obtained by the imaging means, and by use of the extracted image, the machine learning system trained so as to respond to the image within the predetermined area in the sample image of the sample object that is wearing the covering and the machine learning system trained so as to respond to the image within the predetermined area in the sample image of the sample object that is not wearing the covering, the two likelihood values are calculated, and on the basis of the ratio between the two likelihood values, the determining means determines whether or not the object is wearing the covering. Accordingly, the covering to the object may be determined with high reliability. Further, because the determination is executed only for the image within the predetermined area, time required for the process may be reduced.

The determining means determines that the object in the image obtained by the imaging means is wearing the covering when the ratio of the first likelihood value relative to the second likelihood value exceeds a first threshold, and also determines that the object in the image obtained by the imaging means is not wearing the covering when the ratio of the first likelihood value relative to the second likelihood value is less than a second threshold, which is set to be smaller than the first threshold.

Thus, when the ratio of the first likelihood value relative to the second likelihood value is relatively large, it is considered that a level of the possibility where the object is wearing the covering is relatively high, and on the other hand, when the ratio of the first likelihood value relative to the second value is relatively small, it is considered that the level of the possibility where the object is wearing the covering is relatively high. Accordingly, the determination may become more accurately, as a result, the misdetection may occur less frequently.

The program stored in the computer readable medium for the computer executes steps of calculating a first likelihood value for the object shown in the image obtained by the imaging means by use of the image obtained by the imaging means and a machine learning system trained so as to respond to a sample image of a sample object that is wearing a covering, calculating a second likelihood value for the object shown in the image obtained by the imaging means by use of the image obtained by the imaging means and a machine learning system trained so as to respond to a sample image of a sample object that is not wearing a covering, the first likelihood value indicating a level of likelihood that the object is wearing the covering and the second likelihood value indicating a level of likelihood that the object is not wearing the covering and determining whether or not the object, shown in the image obtained by the imaging means, is wearing a covering, on the basis of a ratio between the first likelihood value and the second likelihood value calculated by the likelihood value calculating means.

According to such program, by use of the machine learning system trained so as to respond to the sample image in which the sample object is wearing the covering and the machine learning system so as to respond to the sample image in which the sample object is not wearing the covering, the two likelihood values are calculated, and on the basis of the ratio between the two likelihood values, the determining means determines whether or not the object is wearing the covering. Accordingly, the covering to the object may be determined with high reliability. By use of a ratio between two different likelihood values calculated on the basis of two different machine learning systems as a reference for the estimation, comparing to a case where a single type of a machine learning system is used, a misdetection may occur less frequently. Further, even when the difference between absolute values of the likelihood values calculated on the basis of the two different types of the machine learning systems, because the ratio between the two different likelihood values are used for the determination, a comparison between the level of the likelihood that the object is not wearing the covering and the level of the likelihood that the object is wearing the covering may become clearer. As a result, a level of the accuracy of the detection may be increased. The step for calculating the first likelihood value may be calculated before the step for calculating the second likelihood value, and the step for calculating the first likelihood value may be calculated after the step for calculating the second likelihood value.

The program for the computer further executes steps of extracting, when assuming that the object is wearing the covering, an image within a predetermined area where a covering is estimated to exist, from the image obtained by the imaging means, and wherein the likelihood value calculating means, calculating a first likelihood value for the object shown in the image obtained by the imaging means by use of the image within the predetermined area extracted by the extracting means and a machine learning system trained so as to respond to an image within a predetermined area in a sample image of a sample object that is wearing a covering and calculating a second likelihood value for the object shown in the image obtained by the imaging means by use of the image within the predetermined area extracted by the extracting means and a machine learning system trained so as to respond to an image within a predetermined area in a sample image of a sample object that is not wearing a covering, the first likelihood value indicating the level of likelihood that the object is wearing the covering and the second likelihood value indicating the level of likelihood that the object is not wearing the covering.

According to such program, when assuming that the object is wearing the covering, the image within the predetermined area where the covering is estimated to exist is extracted from the image obtained by the imaging means, and by use of the extracted image, the machine learning system trained so as to respond to the image within the predetermined area in the sample image of the sample object that is wearing the covering and the machine learning system trained so as to respond to the image within the predetermined area in the sample image of the sample object that is not wearing the covering, the two likelihood values are calculated, and on the basis of the ratio between the two likelihood values, the determining means determines whether or not the object is wearing the covering. Accordingly, the covering to the object may be determined with high reliability. Further, because the determination is executed only for the image within the predetermined area, time required for the process may be reduced. The step for calculating the first likelihood value may be calculated before the step for calculating the second likelihood value, and the step for calculating the first likelihood value may be calculated after the step for calculating the second likelihood value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object determining device comprising at least one processor which implements:
    an imager for obtaining an image of the object;
    a likelihood value calculator for calculating a first likelihood value for the object shown in the image obtained by the imager by use of the image obtained by the imager and a machine learning system trained so as to respond to a sample image of a sample object that is wearing a covering, the sample image of the sample object that is wearing the covering is applied with a first teacher signal 1 as a first excitatory information and the sample image of the sample object that is not wearing the covering is applied with a first teacher signal 0 as a first inhibitor information, and for calculating a second likelihood value for the object shown in the image obtained by the imager by use of the image obtained by the imager and a machine learning system trained so as to respond to a sample image of a sample object that is not wearing a covering, the sample image of the sample object that is not wearing the covering is applied with a second teacher signal 1 as a second excitatory information and the sample image of the sample object that is wearing the covering is applied with a second teacher signal 0 as a second inhibitor information, the first likelihood value indicating a level of likelihood that the object is wearing the covering and the second likelihood value indicating a level of likelihood that the object is not wearing the covering; and
    a determiner for determining whether or not the object, shown in the image obtained by the imager, is wearing a covering, on the basis of a ratio between the first likelihood value and the second likelihood value calculated by the likelihood value calculator.

2. The object determining device according to claim 1 wherein the at least one processor further implements an extractor for extracting, when assuming that the object is wearing the covering, an image within a predetermined area where a covering is estimated to exist, from the image obtained by the imager, and
    wherein the likelihood value calculator calculates a first likelihood value for the object shown in the image obtained by the imager by use of the image within the predetermined area extracted by the extractor and a machine learning system trained so as to respond to an image within a predetermined area in a sample image of a sample object that is wearing a covering, the image within the predetermined area in the sample image of the sample object that is wearing the covering is applied with the first teacher signal 1 as the first excitatory information and the image within the predetermined area in the sample image of the sample object that is not wearing the covering is applied with the first teacher signal 0 as the first inhibitor information, and calculates a second likelihood value for the object shown in the image obtained by the imager by use of the image within the predetermined area extracted by the extractor and a machine learning system trained so as to respond to an image within a predetermined area in a sample image of a sample object that is not wearing a covering, the image within the predetermined area in the sample image of the sample object that is not wearing the covering is applied with the second teacher signal 1 as the second excitatory information and the image within the predetermined area in the sample image of the sample object that is wearing the covering is applied with the second teacher signal 0 as the second inhibitor information, and the first likelihood value indicates the level of likelihood that the object is wearing the covering and the second likelihood value indicates the level of likelihood that the object is not wearing the covering.

3. The object determining device according to claim 2, wherein the determiner determines that the object in the image obtained by the imager is wearing the covering when the ratio of the first likelihood value relative to the second likelihood value exceeds a first threshold, and also determines that the object in the image obtained by the imager is not wearing the covering when the ratio of the first likelihood value relative to the second likelihood value is less than a second threshold, which is set to be smaller than the first threshold.

4. The object determining device according to claim 1, wherein the determiner determines that the object in the image obtained by the imager is wearing the covering when the ratio of the first likelihood value relative to the second likelihood value exceeds a first threshold, and also determines that the object in the image obtained by the imager is not wearing the covering when the ratio of the first likelihood value relative to the second likelihood value is less than a second threshold, which is set to be smaller than the first threshold.

5. The object determining device according to claim 1, wherein the object includes a face of a person; and the covering includes one of a mask and colored glasses.

6. A program stored in a non-transitory computer readable medium for a computer executing steps of:
   calculating a first likelihood value for an object shown in an image obtained by an imager by use of the image obtained by the imager and a machine learning system trained so as to respond to a sample image of a sample object that is wearing a covering, the sample image of the sample object that is wearing the covering is applied with a first teacher signal 1 as a first excitatory information and the sample image of the sample object that is not wearing the covering is applied with a first teacher signal 0 as a first inhibitor information;
   calculating a second likelihood value for the object shown in the image obtained by the imager by use of the image obtained by the imager and a machine learning system trained so as to respond to a sample image of a sample object that is not wearing a covering, the sample image of the sample object that is not wearing the covering is applied with a second teacher signal 1 as a second excitatory information and the sample image of the sample object that is wearing the covering is applied with a second teacher signal 0 as a second inhibitor information, the first likelihood value indicating a level of likelihood that the object is wearing the covering and the second likelihood value indicating a level of likelihood that the object is not wearing the covering; and
   determining whether or not the object, shown in the image obtained by the imager, is wearing a covering, on the basis of a ratio between the first likelihood value and the second likelihood value calculated by a likelihood value calculator.

7. The program for the computer according to claim 6 further executing steps of:
   extracting, when assuming that the object is wearing the covering, an image within a predetermined area where a covering is estimated to exist, from the image obtained by the imager;
   calculating a first likelihood value for the object shown in the image obtained by the imager by use of the image within the predetermined area extracted by an extractor and a machine learning system trained so as to respond to an image within a predetermined area in a sample image of a sample object that is wearing a covering, the image within the predetermined area in the sample image of the sample object that is wearing the covering is applied with the first teacher signal 1 as the first excitatory information and the image within the predetermined area in the sample image of the sample object that is not wearing the covering is applied with the first teacher signal 0 as the first inhibitor information; and
   calculating a second likelihood value for the object shown in the image obtained by the imager by use of the image within the predetermined area extracted by the extractor and a machine learning system trained so as to respond to an image within a predetermined area in a sample image of a sample object that is not wearing a covering, the image within the predetermined area in the sample image of the sample object that is not wearing the covering is applied with the second teacher signal 1 as the second excitatory information and the image within the predetermined area in the sample image of the sample object that is wearing the covering is applied with the second teacher signal 0 as the second inhibitor information, the first likelihood value indicating the level of likelihood that the object is wearing the covering and the second likelihood value indicating the level of likelihood that the object is not wearing the covering.

8. The program for the computer according to claim 6, wherein the object includes a face of a person, and the covering includes one of a mask and colored glasses.

9. The program for the computer according to claim 6, wherein it is determined that the object in the image obtained by the imager is wearing the covering when the ratio of the first likelihood value relative to the second likelihood value exceeds a first threshold, and also determined that the object in the image obtained by the imager is not wearing the covering when the ratio of the first likelihood value relative to the second likelihood value is less than a second threshold, which is set to be smaller than the first threshold.

10. A method for determining an object, comprising:
   a likelihood value calculating process for calculating a first likelihood value for an object shown in an image obtained by an imager for obtaining the object, by use of the image obtained by the imager and a machine learning system trained so as to respond to a sample image of a sample object that is wearing a covering, the sample image of the sample object that is wearing the covering is applied with a first teacher signal 1 as a first excitatory information and the sample image of the sample object that is not wearing the covering is applied with a first teacher signal 0 as a first inhibitor information, and for calculating a second likelihood value for the object shown in the image obtained in by the imager by use of the image obtained in by the imager and a machine learning system trained so as to respond to a sample image of a sample object that is not wearing a covering, the sample image of the sample object that is not wearing the covering is applied with a second teacher signal 1 as a second excitatory information and the sample image of the sample object that is wearing the covering is applied with a second teacher signal 0 as a second inhibitor information, the first likelihood value indicating a level of likelihood that the object is wearing the covering and the second likelihood value indicating a level of likelihood that the object is not wearing the covering; and a determining process for determining whether or not the object, shown in the image obtained in by the imager, is wearing a covering, on the basis of a ratio between the first likelihood value and the second likelihood value calculated in the likelihood value calculating process.

11. The method for determining the object according to claim 10, wherein the image obtained by the imager corresponds to an image within a predetermined area where a covering is estimated to exist, which is extracted when assuming that the object is wearing the covering, and the first likelihood value is calculated for the object shown in the image obtained by the imager by use of the image within the area extracted and a machine learning system trained so as to respond to an image within the predetermined area in a sample image of a sample object that is wearing a covering, the image within the predetermined area in the sample image of the sample object that is wearing the covering is applied with a first teacher signal 1 as the first excitatory information and the image within the predetermined area in the sample image of the sample object that is not wearing the covering is applied with a first teacher signal 0 as the first inhibitor information, and the second likelihood value is calculated for the object shown in the image obtained by the imager by use of the image within the area extracted and a machine learning system trained so as to respond to an image within the predetermined area in a sample image of a sample object that is not wearing a covering, the image within the predetermined area in the sample image of the sample object that is not wearing the covering is applied with the second teacher signal 1 as the second excitatory information and the image within the predetermined area in the sample image of the sample object that is wearing the covering is applied with the second teacher signal 0 as the second inhibitor information, the first likelihood value indicating the level of likelihood that the object is wearing the covering and the second likelihood value indicating the level of likelihood that the object is not wearing the covering.

* * * * *